(12) United States Patent
Szczeszynski et al.

(10) Patent No.: US 10,374,512 B2
(45) Date of Patent: Aug. 6, 2019

(54) SWITCH-TIMING IN A SWITCHED-CAPACITOR POWER CONVERTER

(71) Applicant: pSemi Corporation, San Diego, CA (US)

(72) Inventors: Gregory Szczeszynski, Hollis, NH (US); David M. Giuliano, Brookline, MA (US); Raymond Barrett, Jr., Merrimack, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/146,086

(22) Filed: Sep. 28, 2018

(65) Prior Publication Data

US 2019/0036450 A1    Jan. 31, 2019

Related U.S. Application Data

(63) Continuation-in-part of application No. 13/837,796, filed on Mar. 15, 2013, now Pat. No. 8,724,353.

(51) Int. Cl.
*H02M 3/07*  (2006.01)
*H02M 1/08*  (2006.01)

(52) U.S. Cl.
CPC ............ *H02M 3/073* (2013.01); *H02M 1/08* (2013.01)

(58) Field of Classification Search
CPC combination set(s) only.
See application file for complete search history.

(56) References Cited

U.S. PATENT DOCUMENTS 8,710,903 B2 * 4/2014 Oraw ..................... G11C 5/147
                                                      327/337
9,136,756 B2 * 9/2015 Liu ...................... H02M 3/1582

* cited by examiner

*Primary Examiner* — An T Luu
(74) *Attorney, Agent, or Firm* — Occhiuti & Rohlicek LLP

(57) ABSTRACT

In a power converter, each gate-driving circuit uses charge from a selected pump capacitor operate a corresponding switch. The switches transitions between different states, each of which corresponds to a particular interconnection of pump capacitors. During clocked operations, the first switch closes, thereby establishing a connection with the first pump capacitor. Prior to the first switch closing, the second switch closes.

20 Claims, 12 Drawing Sheets

US 10,374,512 B2

SWITCH-TIMING IN A SWITCHED-CAPACITOR POWER CONVERTER

RELATED APPLICATIONS

This application is a continuation-in-part of U.S. application Ser. No. 13/837,796, Mar. 15, 2013, the contents of which are herein incorporated by reference.

FIELD OF INVENTION

This invention relates to switched-capacitor power-converters, and more particularly to efficient gate drivers for such converters.

BACKGROUND

A switch-mode power converter is a specific type of power converter that produces an output voltage by switching energy-storage elements (i.e. inductors and capacitors) into different electrical configurations using a switch network. A switched-capacitor power-converter is a type of switch-mode power converter that primarily utilizes capacitors to transfer energy. In such converters, the number of capacitors and switches increases as the conversion gain increases.

As used herein, conversion gain represents a voltage gain if the switched-capacitor power-converter produces an output voltage that is larger than the input voltage or a current gain if the switched-capacitor power-converter produces an output voltage that is smaller than the input voltage.

SUMMARY

In one aspect, the invention features a switched-capacitor power-converter having gate-driving circuits, each of which uses charge from a selected pump capacitor from a plurality of pump capacitors to operate a corresponding switch from a first plurality of switches, among which is a first switch. During clocked operation of the switched-capacitor power-converter, the first plurality of switches transitions between different states, each of which corresponds to a particular interconnection of the pump capacitors. During clocked operation, the first switch closes, thereby establishing a connection with a first pump capacitor from the plurality of capacitors. Prior to the first switch closing, a second switch closes. As a result of the second switch having closed, the first pump capacitor is pre-charged by the time the first switch closes.

In some embodiments, the second switch is connected such that, when the second switch closes, a voltage arises across the first pump capacitor.

Embodiments also include those in which the second switch connects to the first pump capacitor's anode and those in which the second switch connects to the first pump capacitor's cathode.

In some embodiments, closing the second switch connects the first pump capacitor to a phase voltage. Among these are embodiments in which the second switch and the first switch are synchronized in operation and those in which they are asynchronous. Among these are embodiments in which the first and second switches close concurrently and those in which the second switch closes before the first switch closes. In some of these embodiments, there exists a fixed time interval between closing the second switch and closing the first switch.

Also among the embodiments are those that include a pre-charging circuit configured to limit voltage across the switches from the first plurality of switches during power-up of the switched-capacitor power-converter.

Some embodiments further include a phase generator that includes phase switches, one of which is the second switch. Among these are embodiments in which the phase generator provides first and second phase voltages. In these embodiments, the second switch provides the first phase voltage upon closure thereof and a third switch, which is also part of the phase generator, when closed, provides the second phase voltage. The first plurality of switches includes first and second subsets of switches. Switches in the first subset open and close together. Switches in the second subset open and close together, but at times that differ from times at which the switches in the first subset open and close together. The first switch is in the first subset; the second switch is synchronized with switches in the first subset; and the third switch is synchronized with switches in the third subset. In some of these embodiments, as a result of being synchronized with switches in the first subset, the second switch closes prior to closure of all switches in the first subset, and, as a result of being synchronized with switches in the second subset, the third switch closes prior to closure of all switches in the first subset.

Some embodiments further include a control block that comprises circuitry that is configured to provide a first plurality of drive signals and to provide a second plurality of drive signals. Each drive signal from the first plurality of drive signals is connected to a gate-driving circuit that drives a gate of a transistor from a first plurality of transistors. Each drive signal from the second plurality of drive signals is connected to a gate-driving circuit that drives a gate of a transistor from a second plurality of transistors. The drive signals from the first plurality of drive signals cooperate to cause all transistors that are in the first plurality of transistors to close together following closure of the second switch. The drive signals from the second plurality of drive signals cause all transistors in the second plurality of transistors to close together following closure of a third switch from the second plurality of switches. Among these embodiments are those in which the circuitry comprises a level shifter that is configured to receive first and second voltages and to transform the first and second voltages into third and fourth voltages. In these embodiments, the level shifter is configured to present a voltage difference that is equal to a difference between the third and fourth voltage to a gate terminal of a transistor that is from the first plurality of transistors.

Some embodiments further include a phase generator comprising the second plurality of switches. The phase generator provides a time-varying voltage level to one terminal of each of the pump capacitors and to generate a voltage level for at least one pump capacitor in a first charge-transfer path using a voltage from a pump capacitor in a second charge-transfer path.

In another aspect, the invention features a switched-capacitor power-converter having first and second pluralities of switches and gate-driving circuits corresponding to the switches in the first plurality of switches. The gate-driving circuits rely on charge on pump capacitors to cause the switches from the first plurality of switches to transition between states. The switched-capacitor power-converter undergoes clocked operation having consecutive clock cycles. During each clock cycle, a switch from the second plurality of switches connects to first and second pump capacitors and then a first switch from the first plurality of switches connects to the first pump capacitor and a second switch from the first plurality of switches connects to the second pump capacitor.

In some embodiments, the switch from the second plurality of switches connects to the first and second pump capacitors the first and second pump capacitors begin to charge.

In other embodiments, when the first and second switches from the first plurality of switches connect to the first and second pump capacitors, the first and second pump capacitors begin to discharge.

In yet other embodiments, while the switch from the second plurality of switches is connected to the first and second pump capacitors, a third pump capacitor is being discharged.

In another aspect, the invention features a switched-capacitor power-converter that comprises first and second pluralities of switches and gate-driving circuits corresponding to the switches in the first plurality of switches. The gate-driving rely on charge stored on pump capacitors to cause the switches from the first plurality of switches to transition between states. The switched-capacitor power-converter undergoes clocked operation that consists of consecutive clock cycles, each of which includes a portion during which at most a second switch from the second plurality of switches is connected to the pump capacitors.

In another aspect, the invention features a switched-capacitor power-converter that comprises first and second pluralities of switches and gate-driving circuits corresponding to the switches in the first plurality of switches. The gate-driving circuits rely on charge on pump capacitors to cause the switches from the first plurality of switches to transition between states. The switched-capacitor power-converter undergoes clocked operation that defines consecutive clock cycles. During each clock cycle, a switch from the second plurality of switches connects to a first pump capacitor and then a first switch from the first plurality of switches connects to the first pump capacitor.

In some embodiments, when the switch from the second plurality of switches connects to the first pump capacitor, the first pump capacitor begins to charge.

In other embodiments, the switch from the second plurality of switches connects to both the first pump capacitor and a second pump capacitor, and wherein, after the switch from the second plurality of switches has closed, a second switch from the first plurality of switches connects to a second pump capacitor.

In yet other embodiments, while the switch from the second plurality of switches is connected to the first pump capacitor, a second pump capacitor is being discharged.

Other features and advantages of the invention are apparent from the following description, and from the claims.

DETAILED DESCRIPTION

Figure 1:
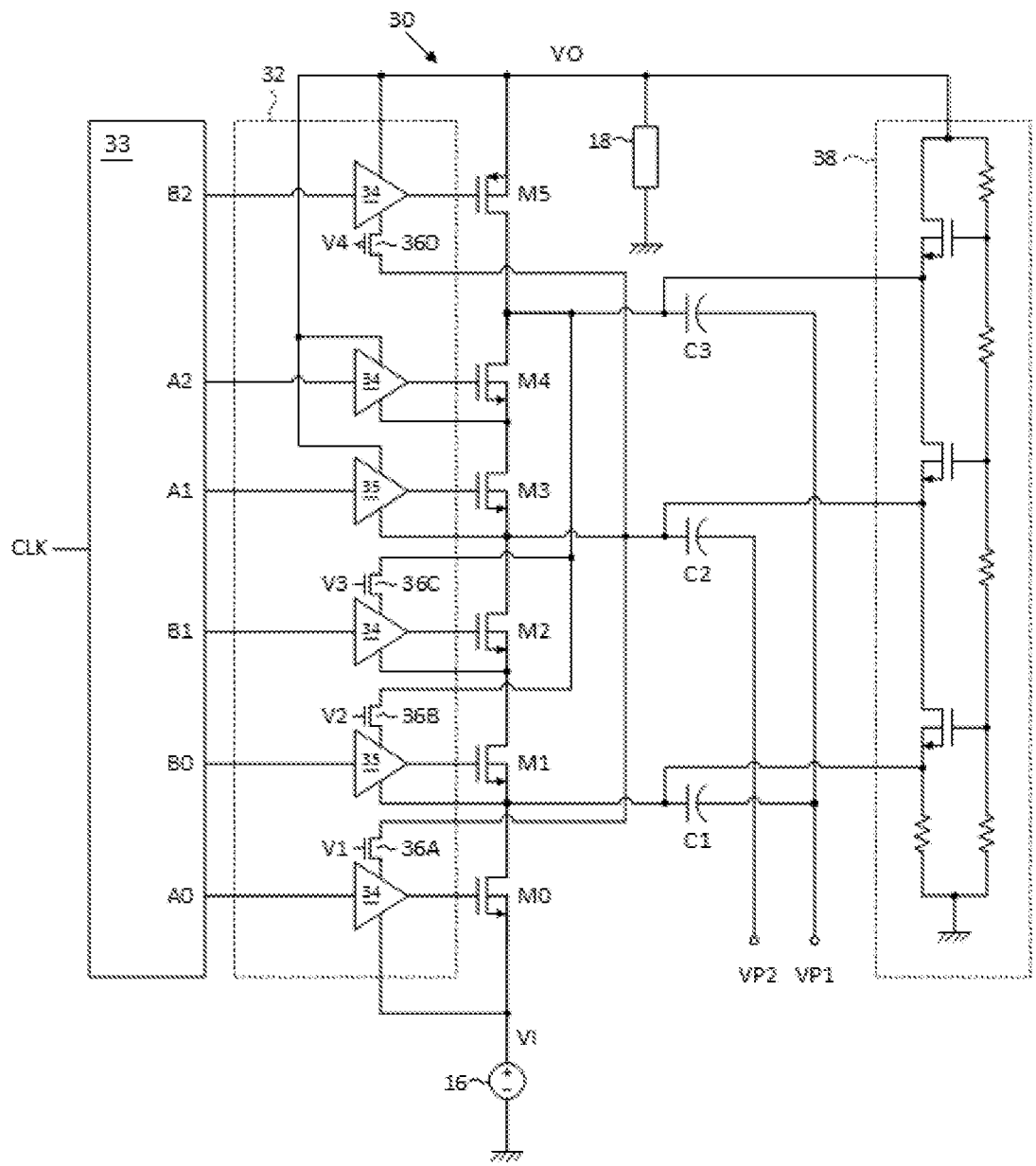
FIG. 1 shows a single-phase cascade-multiplier with cascoded switches and corresponding gate drivers and a pre-charging circuit.

Referring to FIG. 1, a first cascade-multiplier 30 that has a charge-transfer path extending between a high-voltage terminal VO and a low-voltage terminal VI. The charge-transfer path includes transistors M0-M5 that interconnect pump capacitors C1-C3. More specifically, the charge-transfer path has three stack-nodes. Because there is only one charge-transfer path, the first cascade multiplier 30 is considered to be a "single-phase" cascade multiplier.

Each stack node connects to a pair of transistors and also to a pump capacitor. At a first stack-node, first and second transistors M0, M1 connect to an anode of a first pump-capacitor C1. The cathode of the first pump-capacitor C1 connects to a first phase-node on which is present a first phase-voltage VP1. The first phase-voltage VP1 typically arises by opening and closing first phase-switches at the desired frequency.

At a second stack-node, third and fourth transistors M2, M3 connect to the anode of a second pump-capacitor C2, the cathode of which connects to a second phase-node on which is present a second phase-voltage VP2 that is out-of-phase with the first phase-voltage VP1. The second phase-voltage VP2 typically arises by opening and closing second phase-switches at the desired frequency.

At a third stack-node, fifth and sixth transistors M4, M5 connect to the anode of a third pump-capacitor C3, the cathode of which connects to the first phase-node.

For ease of exposition, the transistors M0-M5 will sometimes be referred to as "switches" or "stack switches." The states of these switches will be referred to as "open" and "closed." In the "closed" state, which is sometimes called the "on" state, the switch allows current to flow through it. In the "open" state, which is sometimes called the "off" state, the switch suppresses flow of current through it.

The embodiment illustrated in FIG. 1 features cascoded second and third transistors M1, M2 to couple the first and second pump capacitors C1, C2 Similarly, the fourth and fifth transistors M3, M4 are cascoded to couple the second and third pump capacitors C2, C3. However, it is possible to use single transistors instead of cascoded transistors while still reaping some of the advantages described herein.

Each of the transistors M0-M5 implements a switch. To open and close these switches requires causing charge to flow in and out of a metal plate that lies over a gate region of these transistors M0-M5. The act of causing such charge flow in and out of this metal plate is referred to herein as "driving" the transistor. The metal plate will be referred to herein as the "gate terminal" of the transistor.

The charge that flows in and out of a transistor's gate terminal during the driving process comes from a donor capacitor. In the embodiment shown, which has only one charge-transfer path, the donor capacitor is one of the pump capacitors on the same charge-transfer path as the transistor.

In the case of a multi-phase converter, which has multiple charge-transfer paths, the donor capacitor is a pump capacitor that is on another charge-transfer path.

A driver set 32 includes first, second, third, and fourth voltage followers 36A-36D that receive corresponding first, second, third, and fourth bias voltages V1-V4. It also includes circuitry that causes the switches M0-M5 to open and close in response to drive signals A0, B0, B1, A1, A2, B2 provided by level shifters within a control block 33. The control block 33 generates its drive signals A0, B0, B1, A1, A2, B2 in response to a clock signal CLK.

The driver set 32 implements two kinds of drivers: a low-voltage driver 34 and a high-voltage driver 35, both of which rely on a circuit across which a supply voltage is maintained during operation. The main difference is that the high-voltage driver 35 incorporates a circuit that supports twice the supply voltage as that used in a low-voltage gate driver 34. Because of their locations within the circuit, a high-voltage driver 35 is the best choice for driving the second and fourth transistors M1, M3. The remaining four transistors M0, M2, M4, M5 require only a low-voltage driver 34.

Each driver 34, 35 connects to the gate terminal of a corresponding one of the transistors M0-M5. In particular, the two high-voltage drivers 35 connect to corresponding gates of the second and fourth transistors M1, M3. The four low-voltage drivers 34 connect to the remaining first, third, fifth, and sixth transistors M0, M2, M4, M5.

A typical drive-signal A0, B0, B1, A1, A2, B2 from the control block 33 is a square wave. Each level shifter within the control block 33 ensures that the square wave spans a voltage range that conforms to the performance requirements of the circuit that implements its corresponding gate driver 34, 35.

The square wave's upward transitions trigger release of a flow of charge from the gate driver 34, 35 and into the corresponding transistor's gate. This rapidly floods the transistor's gate terminal with charge, which then rapidly forms an electric field in the transistor's gate region. This electric field forms a conducting channel so that the transistor is able to conduct current between its drain and source regions. This amounts to closing the switch.

The square wave's downward transitions trigger the rapid evacuation of charge from the transistor's gate terminal, thus dissipating the electric field and collapsing the conducting channel in the gate region. As a result, the drain and source regions are once more isolated from each other. This amounts to opening the switch.

As the first cascade-multiplier 30 operates, the switches M0-M5 transition between three different states.

Figure 2:
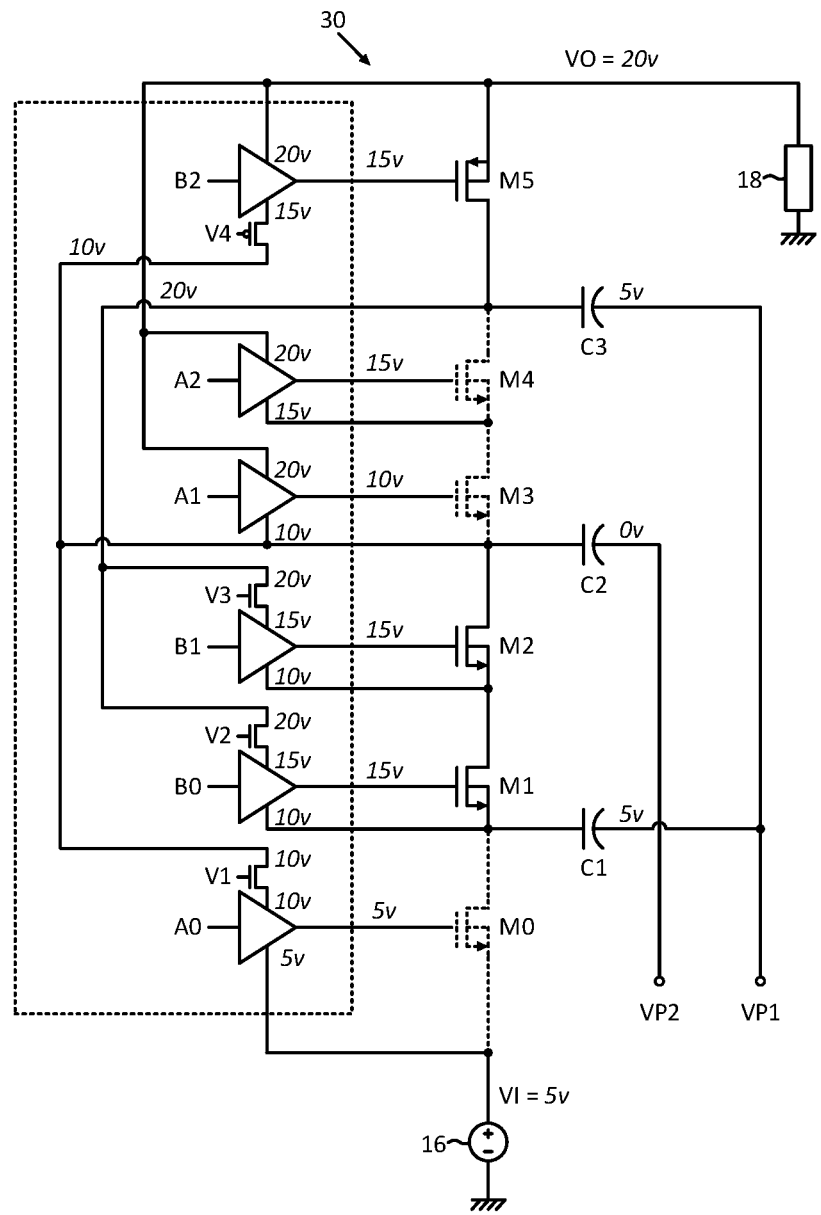
FIG. 2 shows the cascade multiplier of FIG. 1 in a first operating-phase.

In a first state, the control block 33 opens all switches from a first subset of stack switches M0, M3, M4 and closes all switches from a second subset of stack switches M1, M2, M5. This is shown in FIG. 2, in which dashed lines represent transistors in a non-conducting state.

Figure 3:
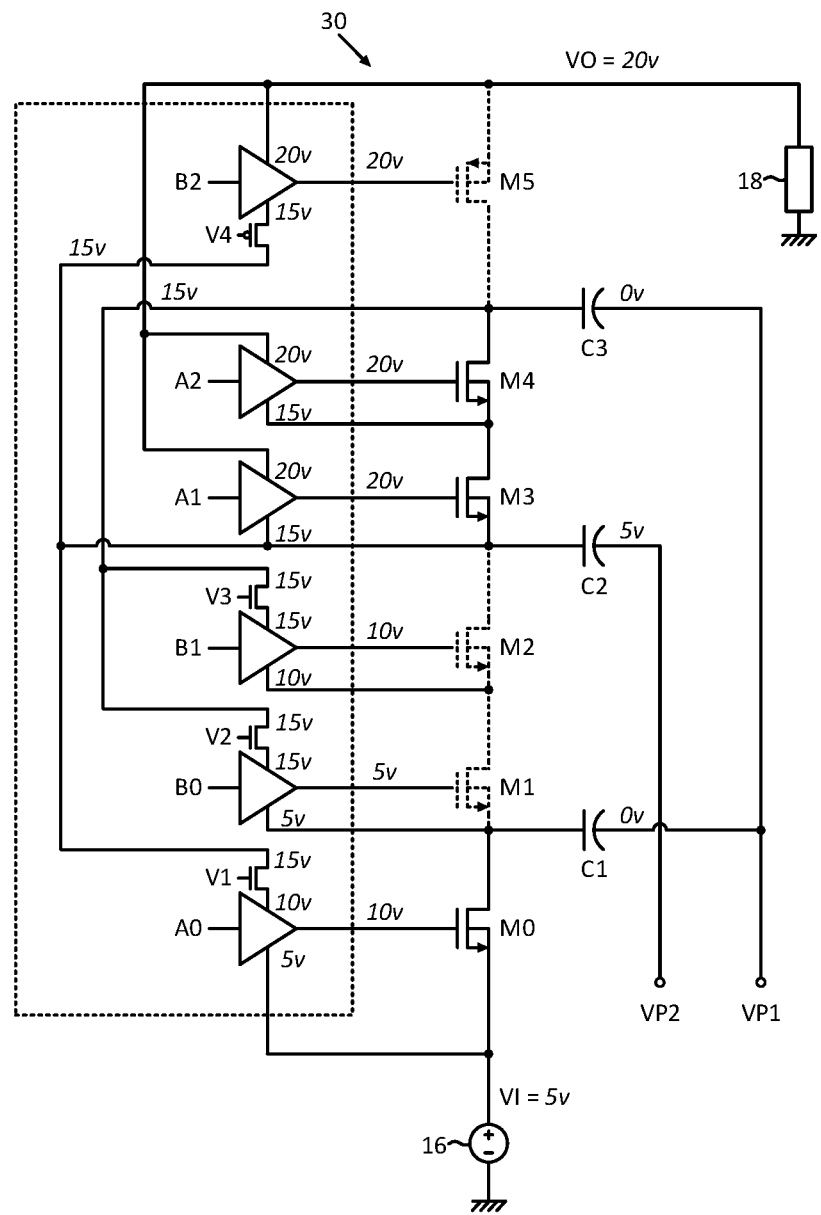
FIG. 3 shows the cascade multiplier of FIG. 1 in a second operating-phase.

In a second state, the control block 33 closes the switches from the first subset M0, M3, M4 and opens the switches from the second subset M1, M2, M5. This is shown in FIG. 3, in which dashed lines represent transistors in a non-conducting state.

And in a third state, which occurs between the first and second state, the control block 33 opens all of the switches M0, M1, M2, M3, M4, M5. The placement of this third state between the first and second states in time reduces the possibility of having switches from the first and second subsets open at the same time.

For convenience in exposition, drive signals for switches in the first subset are labeled by alphanumeric strings that begins with "A" and drive signals from a second set are labeled by alphanumeric strings that begin with a "B." The drive signals A0, B0, B1, A1, A2, B2 control corresponding transistors M0, M1, M2, M3, M4, M5.

As described in more detail below, at least some of the gate drivers 34, 35 are powered from the pump capacitors C1-C3 in the charge-transfer path. The voltage across each of the pump capacitors C1-C3 is a fraction of the high voltage drop between the voltage at the high-voltage terminal VO and the voltage at the low-voltage terminal VI. This promotes efficient generation of gate-driving signals that maintain desired limits on the gate-to-source voltages of the transistors M0-M5.

Each of the voltage followers 36A-36D receives a first voltage from a corresponding one of the pump capacitors C1-C3 and provides a constant second voltage to the corresponding gate-drivers 34, 35. The second voltage is equal to or lower than the first voltage.

When a particular voltage-follower, for example the first voltage-follower 36A, provides a second voltage that is equal to the first voltage, the first voltage-follower 36A behaves like a switch. To achieve this behavior, the first, second, and third bias voltages V1-V3 are at least a threshold voltage above the corresponding source voltage while the fourth bias voltage V4 is at least a threshold voltage below the corresponding source voltage. The voltage followers 36A-36D experience the same voltage stress as the transistors M0-M5 in the first cascade-multiplier 30.

Also illustrated in FIG. 1 is an example of a pre-charge circuit 38 that carries out certain functions just before clocked operation of the first cascade-multiplier 30 begins.

The pre-charge circuit 38 initializes the voltages on the pump capacitors C1-C3 before clocked operation of the first cascade-multiplier 30 actually begins. It also charges any parasitic capacitances inherent in the circuit. Pre-charging the pump capacitors C1-C3 helps maintain the drain-to-source voltages across the transistors M0-M5 within required limits during startup. In addition, the pre-charged pump capacitors C1-C3 power the gate drivers immediately upon the start of clocked operation of the first cascade-multiplier 30. Once clocked operation has begun, the pre-charge circuit 38 can be disabled.

To facilitate the use of low-voltage transistors, the pre-charge circuit 38 uses a combination of low-voltage transistors and bias resistors. A resistor divider sets up the pre-charge voltage for each of the pump capacitors C1-C3 during startup. The source voltage of each transistor within the pre-charge circuit 38 is at least a threshold voltage below its corresponding gate voltage. This avoids the risk of exposing any of the transistors, either in pre-charge circuit 38 or in the first cascade-multiplier 30, to device-damaging voltage stresses, either during startup or during clocked operation.

The first cascade-multiplier 30 transfers energy from a source 16 to a load 18 by cycling between the first and second states at a specific frequency. All of the transistors coupled with the "A" drive signals are activated and de-activated at the same time; as is the case for all of the transistors coupled with the "B" drive signals. To ensure a clean transition between the first and second state, the "A" signals and "B" signals are non-overlapping. In particular, the "A" and "B" signals are separated in time by the duration of the third state.

Operation of the first cascade-multiplier 30 also requires the presence of first and second phase voltages VP1, VP2 at the first and second phase nodes. A phase generator 110, best seen in FIGS. 8 and 9 and in more detail in FIGS. 10-12 generates these phase voltages through sequential opening and closing of phase switches ML1, ML2, MH1, MH2. In the illustrated embodiment, the phase generator 110 does so by using a voltage at the anodes of pump capacitors C1A, C1B, which connect to corresponding supply inputs NC1, NC2 of the phase generator 110. However, any convenient capacitor can be used to supply the necessary voltage. For example, in the configuration shown in FIG. 8B, voltage-following capacitors Ca, Cb can be used.

Figure 8:
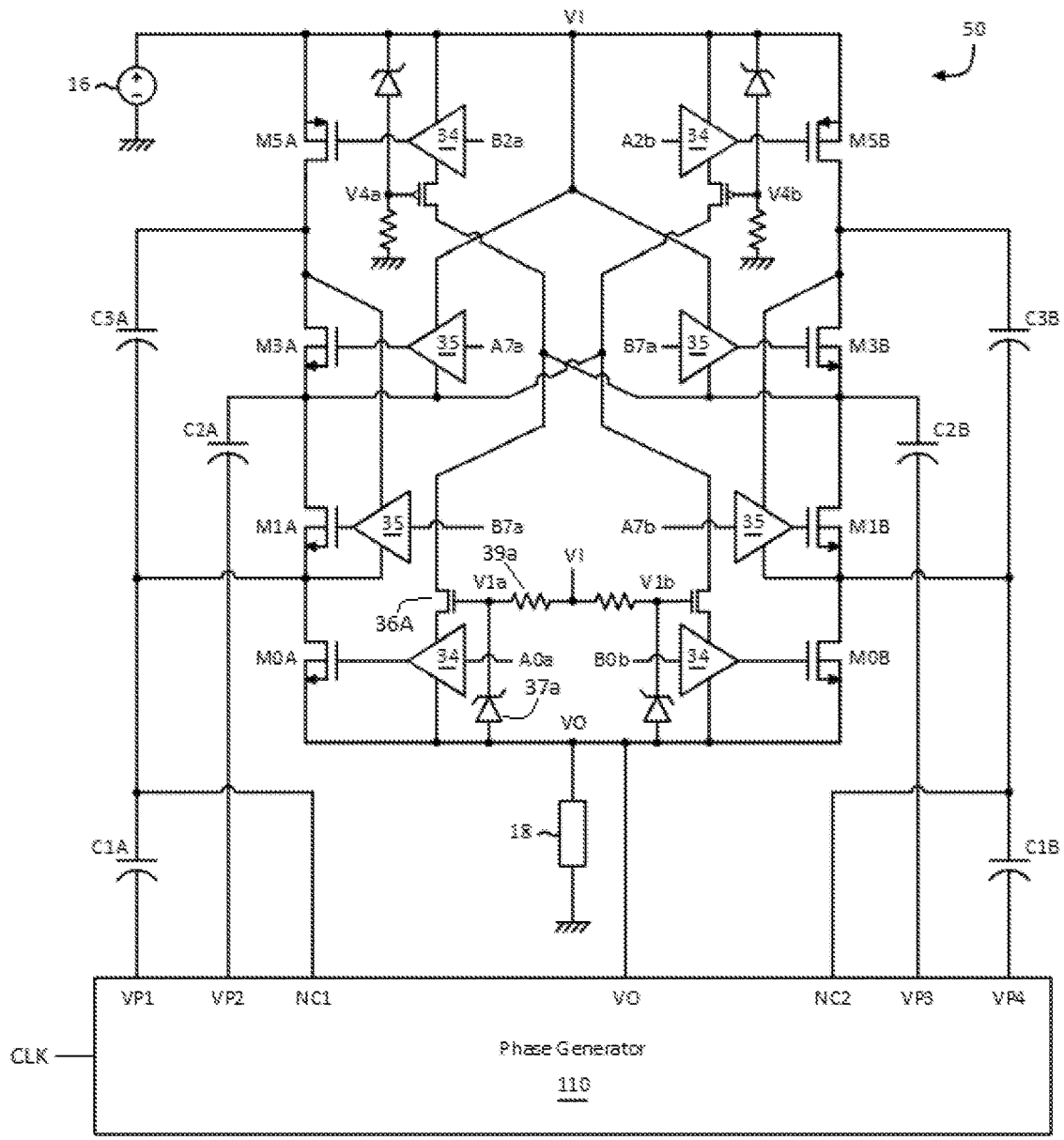
FIGS. 8 and 9 show a dual-phase cascade multiplier and corresponding gate drivers.

The particular phase generator 110 provides four phase voltages VP1, VP2, VP3, VP4, as shown in FIG. 8. However, it is a simple matter to adapt it to generate only the two phase-voltages VP1, VP2 that are required for a single-phase cascade-multiplier 30 as shown in FIG. 1.

The first and second phase voltages VP1, VP2 are synchronized with the "A" signals and "B" signals, and thus, with opening and closing of the stack switches M0-M5.

Some embodiments achieve synchronization by opening and closing phase switches ML1, MH1, ML2, MH2 at the same time that corresponding stack switches transition out of the third state M0-M5. Other embodiments achieve synchronization by opening and closing the phase switches ML1, MH1, ML2, MH2 at times that are at some fixed interval before or after the corresponding stack switches M0-M5 transition out of the third state. In a particularly preferred practice, the phase switches close at some fixed interval before the stack switches M0-M5 transition out of the third state. This creates a brief interval during which the phase switches ML1, MH1, ML2, MH2 are already closed while the stack switches M0-M5 are still open. After the lapse of this brief interval, the stack switches M0-M5 transition out of the third state. As a result, the phase switch and the corresponding stack switches will both be closed.

Assuming an input voltage of five volts at the low-voltage terminal VI, the first cascade-multiplier 30 produces a twenty-volt output voltage at the high-voltage terminal VO. The maximum voltage across any transistor is five volts. Furthermore, the low-voltage gate drivers 34 support five volts while the high-voltage gate drivers 35 must support ten volts.

Upon commencement of the first state, shown in FIG. 2, the first phase voltage VP1 will have been at five volts while the second phase voltage VP2 will have been at zero volts. The gate drivers that receive a "B" signal activate their corresponding transistors and the gate drivers that receive an "A" signal de-activate their corresponding transistors. Consequently, a gate voltage of fifteen volts activates the second, third, and sixth transistors M1, M2, M5 while gate voltages of five volts, ten volts, and fifteen volts de-activate the first, fourth, and fifth transistors M0, M3, M4, respectively.

In contrast, FIG. 3 illustrates the second state, which begins shortly after the first and second phase voltage VP1, VP2 have reached zero and five volts respectively. When transitioning from the third state to the second state, the gate drivers that receive an "A" signal activate their corresponding transistors and the gate drivers that receive a "B" signal de-activate their corresponding transistors. Consequently, gate voltages of five volts, ten volts, and twenty volts de-activate the transistors M1, M2, M5, respectively; while gate voltages of ten volts, twenty volts, and twenty volts activate the transistors M0, M3, M4, respectively.

In the course of opening and closing a transistor M0, M1, M2, M5, charge flows towards and away from the gate terminals of those transistors. This charge inevitably passes between the source and drain of the voltage follower 36A-36D associated with that transistor. Since there exists a five-volt drop between a voltage follower's drain and source terminals, this current from its source to its drain represents lost power. In the case of the second, third, and sixth transistors M1, M2, M5, this power loss occurs during the first state. In the case of the first transistor M0, this occurs during the second state. The fourth transistor M3 and the fifth transistor M4 do not have associated voltage followers. Hence, this difficulty does not arise for those transistors.

In the first cascade-multiplier 30, charge transfers to a load 18 from a source 16 at a rate dictated by the load 18. Because the first cascade-multiplier 30 is a single-phase cascade-multiplier, there is only one charge-transfer path along which charge can be transferred.

For example, at the start of a first clock-cycle, a charge leaves the source 16 and flows into the first pump-capacitor C1. After a state transition, the charge moves to the second pump-capacitor C2. When a second clock-cycle begins, the charge moves from the second pump-capacitor C2 to the third pump-capacitor C3. After one more state transition, the charge finally reaches the load 18. Thus, the time required for the charge to traverse the charge-transfer path from the source 16 to the load 18 was the time for two full clock cycles, or four consecutive states.

In general, as the conversion gain of a cascade multiplier increases, the number of pump capacitors increases. Consequently, it takes a longer time for a charge from the source 16 to reach the load 18 because the charge needs to traverse more pump capacitors. For the switched-capacitor topologies shown, the number of clock cycles in the charge-transfer path is two less than the conversion gain. In the illustrated example, the conversion gain is equal to four. Therefore, the number of clock cycles is two.

Figure 4:
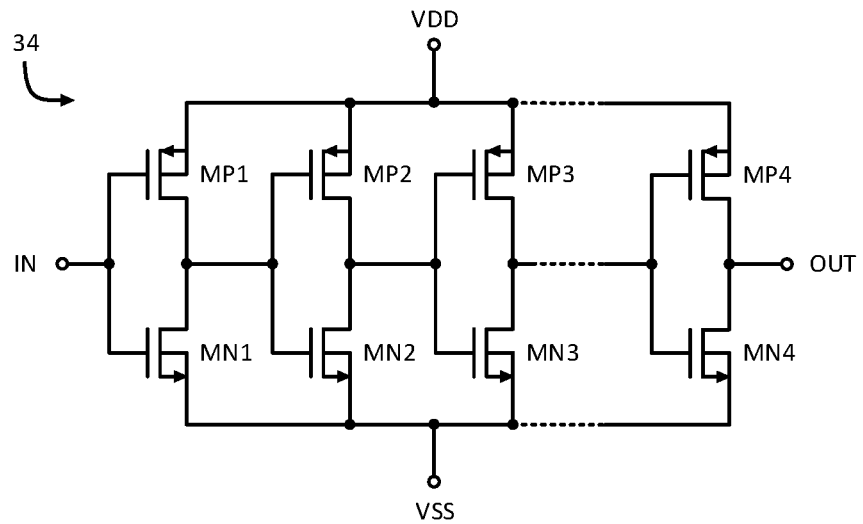
FIG. 4 shows a tapered gate-driver used to drive stack switches in the cascade multiplier of FIG. 1.
Figure 5:
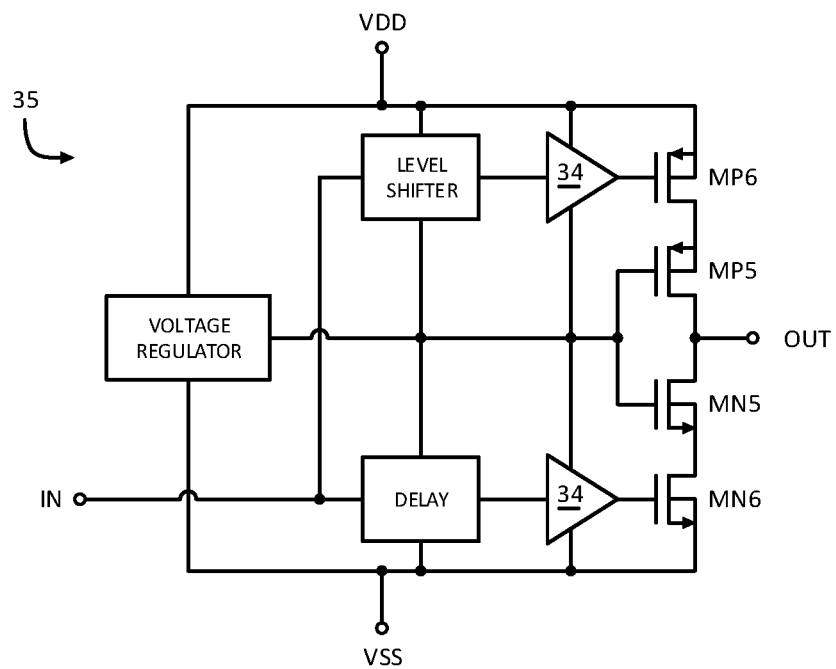
FIG. 5 shows a cascoded gate-driver used to drive stack switches in the cascade multiplier of FIG. 1.

FIGS. 4-5 illustrate two alternative designs of the gate driving circuits, both of which can be used for the high-voltage drivers 35 and the low-voltage drivers 34. However, as will be made clear in the following description, the gate driver in FIG. 4 is more suitable for the low-voltage gate driver 34 while the gate driver in FIG. 5 is more suitable for the high-voltage gate driver 35.

The first alternative design, shown in FIG. 4, has an input terminal IN, an output terminal OUT, and first and second supply terminals VDD, VSS. The input terminal IN couples with the output terminal OUT through first, second, third, and fourth inverters, in that order. Each inverter has a high-side PMOS transistor MP1-MP4 and a corresponding low-side NMOS transistor MN1-MN4. Due to the difference between electron and hole mobilities, each of the PMOS transistors MP1-MP4 is typically sized larger than its corresponding NMOS transistor MN1-MN4.

Starting at the input terminal IN, each subsequent inverter is k times larger than the previous inverter. For example, if k is equal to five and the width of the first inverter is one micron, then the widths of the second, third, and fourth inverters are five microns, twenty-five microns, and one hundred and twenty-five microns, respectively. For this reason, the design shown in FIG. 4 is often called a "tapered gate-driver." By tapering the inverters, a small logic gate coupled to the input terminal IN is able to drive a large power transistor coupled to the output terminal OUT.

The maximum supply voltage of the tapered gate-driver is less than or equal to the breakdown voltage of the transistors. Therefore, the tapered gate-driver is a good choice for the low-voltage gate drivers 34 in the first cascade-multiplier 30. Unfortunately, due to the higher voltage requirements of the high-voltage gate-driver 35 in FIGS. 1-3, the tapered gate-driver requires transistors with twice the breakdown voltage.

A cascoded gate-driver, as shown in FIG. 5, avoids this difficulty. Unlike the tapered gate-driver, the cascoded gate-driver permits increasing the supply voltage while avoiding the need of higher voltage transistors.

The cascoded gate driver includes an input terminal IN, an output terminal OUT, and supply terminals VDD, VSS. The cascoded gate driver features an output stage that includes first and second high-side transistors MP5, MP6 and first and second low-side transistors MN5, MN6. The output stage requires additional support circuitry, such as a level shifter, two gate-drivers, a delay block, and a voltage regulator, all of which can be designed using transistors with the same breakdown voltage as that of the transistors in the output stage.

During normal operation of the cascoded gate driver, the high-side transistors MP5, MP6 are activated when the low-side transistors MN5, MN6 are de-activated and vice-versa. Therefore, two de-activated transistors are always available to support the differential voltage across the supply terminals VDD, VSS. This means that the cascoded gate-driver can support twice the supply voltage.

In general, a larger number of transistors can be cascoded to increase the supply voltage further. For example, if the output stage included three high-side transistors and three low-side transistors then the maximum supply voltage would be tripled and so on. Unfortunately, as the number of cascoded transistors increases, so does the complexity of the support circuitry.

Unlike a single-phase cascade-multiplier, such as the first cascade-multiplier 30, a multi-phase cascade-multiplier has two or more charge-transfer paths that operate temporally out-of-phase with each other.

Figure 6:
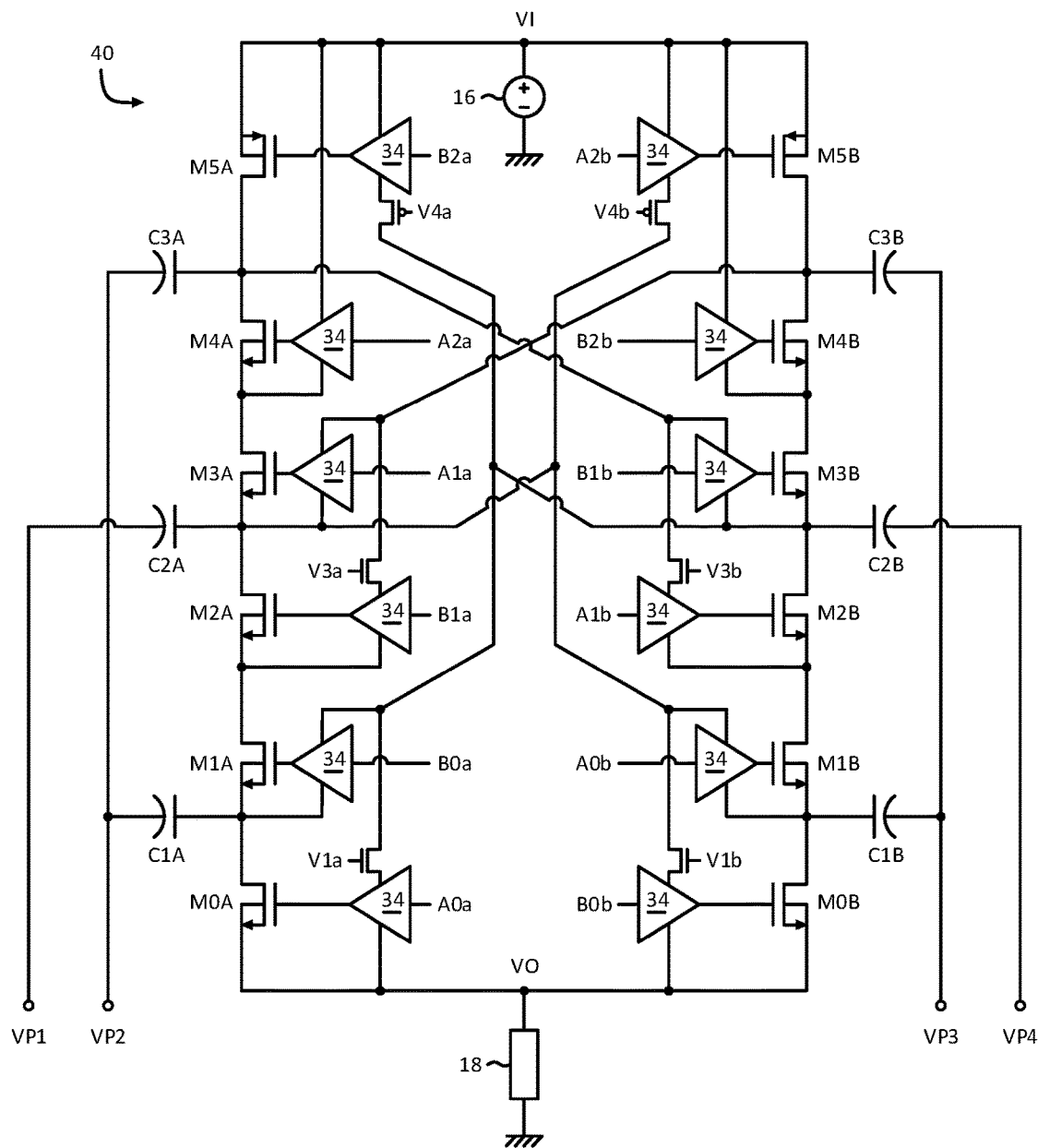
FIG. 6 shows a dual-phase cascade-multiplier with cascoded switches and corresponding gate drivers.

FIG. 6 shows second cascade-multiplier 40 constructed by placing two copies of the single-phase cascade-multiplier 30 in parallel. Each copy of the single-phase cascade-multiplier will be referred to as a "phase."

The second cascade-multiplier 40 features a first phase and a second phase. The first phase includes a first set of pump capacitors C1A-C3A, a first set of transistors M0A-M5A, and a first first-phase-voltage VP1 and a second first-phase-voltage VP2. The second phase includes a second set of pump capacitors C1B-C3B, a second set of transistors M0B-M5B, a first second-phase-voltage VP3 and a second second-phase-voltage VP4.

Each of the transistors M0A-M5B has a corresponding gate driver 34 that receives a driver signal with a label either beginning with an "A" or a "B." The first phase includes first-phase drive-signals A0a-B2a while the second phase includes second-phase drive-signals A0b-B2b.

The phase difference between the first-phase drive-signals A0a-B2a and the second-phase drive-signals A0b-B2b achieved by swapping the "A" and "B" signals in one of the two phases and then inverting the corresponding phase voltages. For example, in normal operation, the first first-phase voltage VP1 and the first second-phase voltage VP3 are in a state that is complementary to that of the second first-phase voltage VP2 and the second second-phase voltage VP4.

The voltage followers in the first phase receive first-phase bias-voltages V1a-V4a. The voltage followers in the second phase receive second-phase bias-voltages V1b-V4b.

A control circuit generates the first-phase bias voltages V1a-V4a, the second-phase bias-voltages V1b-V4b, the first-phase drive-signals A0a-B2a and the second-phase drive-signals A0b-B2b.

When the source 16 and the load 18 trade places, a step-down power-converter becomes a step-up converter and vice versa. Therefore, the second cascade-multiplier 40 is a step-down power-converter instead of a step-up power-converter, as was the case for the first cascade-multiplier 30.

Figure 7:
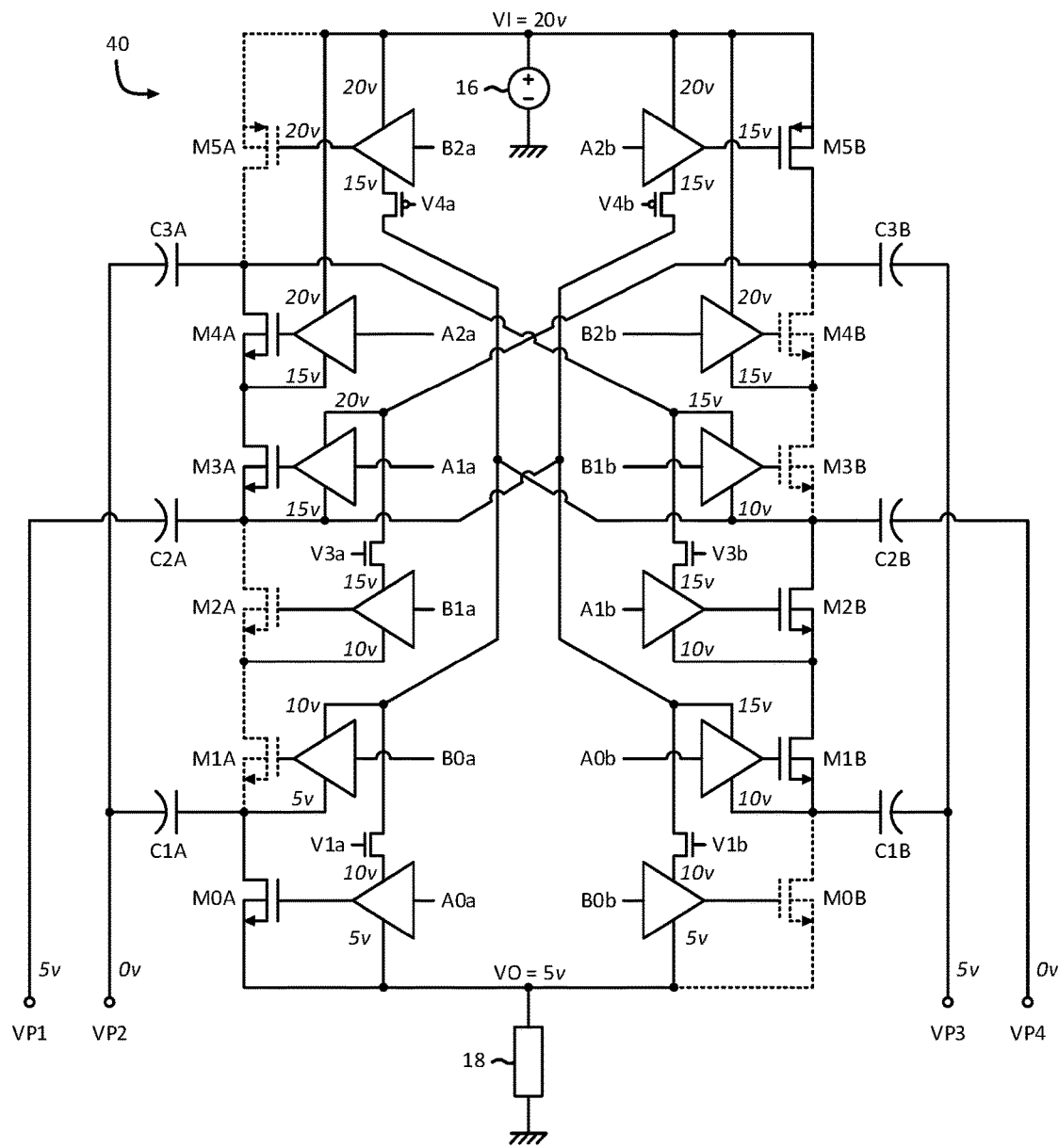
FIG. 7 shows the cascade-multiplier of FIG. 6 in one of two states of operation.

The second cascade-multiplier 40 operates as described in connection with FIGS. 1-3. Assuming a twenty-volt input voltage at the low-voltage terminal VI, the resulting voltage levels powering the gate driving circuits can be understood with reference to FIG. 7, which shows the first operating-state. Depicting the second operating-state is not necessary since it is simply a mirror image of the first operating-state already shown in FIG. 7.

There are several benefits of dual-phase construction over single-phase construction.

One benefit is that a charge-transfer path will always exist between the source 16 and the load 18 regardless of the state of operation.

Another benefit is that the one phase can derive energy from an alternate phase to power circuitry and vice versa. This allows the second cascade-multiplier 40 to only use low-voltage gate drivers 34.

Yet another benefit is that there are fewer voltage followers required. This is because the transistors M0A-M3B derive power from opposing phases while the transistors M4A-M5B derive power from the input voltage at the low-voltage terminal VI. Powering the gate drivers from a parallel charge-transfer path, which is operating with opposing phase, eliminates one voltage follower in each case.

Yet another advantage of the dual-phase configuration of the second cascade-multiplier 40 is that those voltage followers that do remain no longer consume power. This is because those transistors that still use voltage followers as part of their gate drives, namely the transistors M0A, M2A, M5A, M0B, M2B, M5B, are no longer conducting at the time that voltage is being dropped across their corresponding voltage followers. With no current flowing, power loss becomes impossible. As a result, those voltage followers that remain operate far more efficiently than their counterparts in the first cascade-multiplier 30.

In comparing the first and second cascade-multipliers 30, 40, it should be apparent that there is something else missing in the second cascade multiplier 40: namely, high-voltage gate-drivers 35. These high-voltage gate-drivers 35 are yet another casualty of having more than one charge-transfer path.

Because of the more efficient voltage followers and the elimination of high-voltage gate-drivers 35, the energy required to drive the gates in a dual-phase design is actually less than the energy required in a single-phase design. This is true even though there are many more individual components in the dual-phase design.

As in the single-phase construction of FIG. 1, it takes two full clock-cycles for a charge to traverse the second cascade-multiplier 40 and reach the load 18. However, in the dual-phase construction, there are two charge-transfer paths between the source 16 and the load 18, instead of just one. Moreover, the two charge-transfer paths are operated out-of-phase. This means that when one is idle, the other can be busy.

For example, consider what happens to a charge after it enters a first charge-transfer path at the input of the second cascade-multiplier 40.

During each state transition, the charge hops from the anode of one pump capacitor to the anode of the next pump capacitor. Thus, by the end of a first state transition, the charge is at the anode of a first pump capacitor C3B. By the end of a second state transition, the charge is at the anode of a second pump capacitor C2B. By the end of a third state transition, the charge is at the anode of a third pump capacitor C1B. Finally, at the end of a fourth state transition, the charge reaches the load 18.

Similarly, in a second charge-transfer path, the same procedure occurs. A charge hops from one anode to the next along first, second, and third pump capacitors C3B, C2B, C1B of the second charge-transfer path. However, the second charge-transfer path operates 180 degrees out-of-phase from the first charge-transfer path. As a result, a path for charge always exists between the source 16 and the load 18.

The above described dual-phase second cascade-multiplier 40 is one of many different implementations.

For example, FIG. 8 illustrates a third cascade-multiplier 50 that also has two charge-transfer paths. The third cascade-multiplier 50 features inner switches M1A, M3A, M1B, M3B that are able to support twice the output voltage as well as their corresponding gate drivers 35. As a result, it is possible to omit the cascoded switches M2A, M4A, M2B, M4B in the second cascade-multiplier 40. This reduces control complexity and perhaps improving robustness.

Additionally, the third cascade-multiplier 50 features pump capacitors C3A, C3B that are pumped in series with their corresponding pump capacitors C1A, C1B instead of being pumped in parallel as in the second cascade-multiplier 40. The series arrangement reduces the voltage across the pump capacitors C3A, C3B.

For example, a five-volt output voltage at the high-voltage terminal VO results in ten volts across the pump capacitors C3A, C3B in FIG. 8. This is significantly lower than the fifteen volts across the counterpart pump capacitors in FIG. 6. Due to the similarity between the second and third cascade multipliers 40, 50, the third cascade-multiplier 50 operates as described in connection with FIG. 7.

A voltage follower 36A maintains the supply voltage for the driver 34 that drives the transistor M0A. In the illustrated embodiment, the voltage follower 36A is a transistor whose gate connects to a bias voltage V1a.

A voltage difference between the voltage at the low-voltage terminal VI and the voltage at the high-voltage terminal VO is what ultimately supports the bias voltage V1a. However, this voltage difference is apt to fluctuate, much to the detriment of proper operation. Therefore, to tame this fluctuating voltage difference, it is useful to connect the anode of a Zener diode 37A to the high-voltage terminal VO and to connect the cathode of the Zener diode 37A to the low-voltage terminal VI through a voltage-absorbing resistor 39A. In this configuration, the cathode of the Zener diode 37A remains at a constant voltage V1a. By also connecting the gate of the voltage follower 36A to the cathode of the Zener diode 37A, it becomes possible to bias the voltage follower 36A at this constant voltage.

A similar principle is used to maintain constant bias voltages V1b, V4a, V4b the remaining low-voltage drivers 34 in the cascade multiplier 50 use a similar principle in which a resistor absorbs fluctuations so that the voltage across the Zener diode can be clamped to a constant value that can then be provided to the relevant voltage follower's gate.

Figure 10:
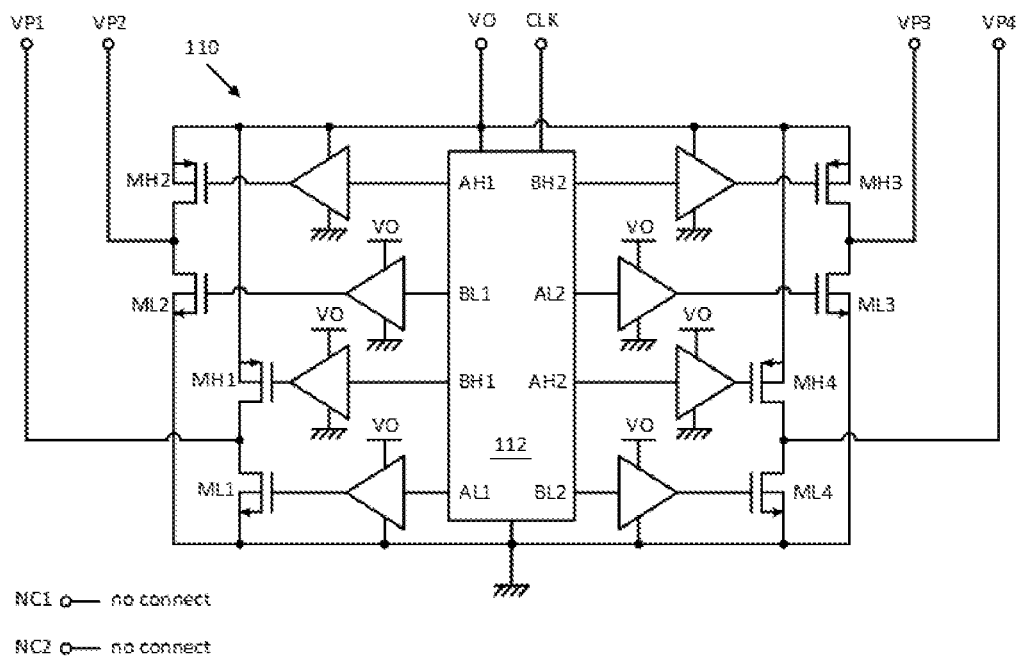
FIGS. 10-12 shows different phase generators for use with the circuits shown in FIGS. 8 and 9.
Figure 11:
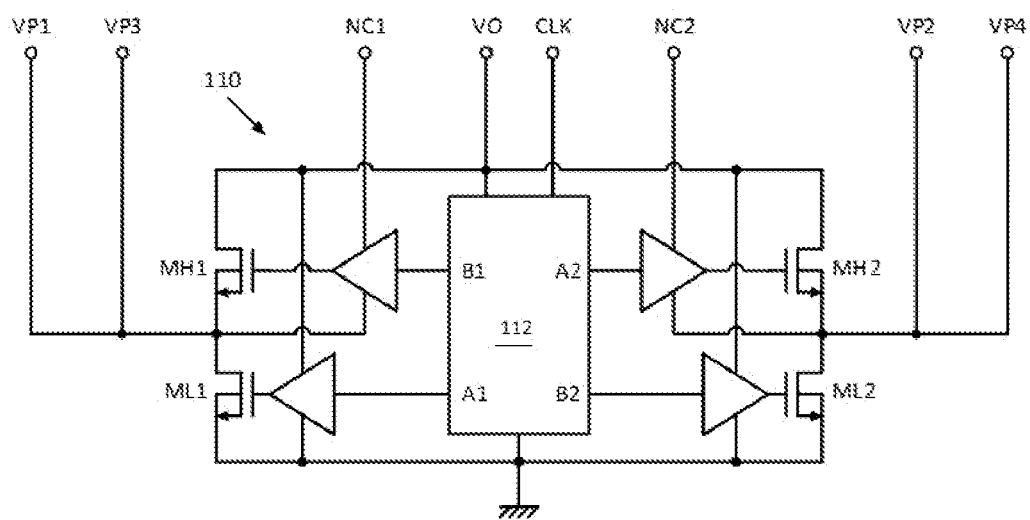

The capacitor voltages have uses other than promoting efficient generation of gate-driving signals. For example, the capacitor voltages can also be used to efficiently drive the phase signals that drive the capacitors. Two examples of a phase generator 110 for carrying this out are shown in FIGS. 10-11. These are suitable for use with the dual-phase third cascade-multiplier 50 shown in FIGS. 8 and 9.

There are other ways to maintain a constant supply voltage that do not require the arrangement used for the low-voltage driver 34 that drives the transistor M0A. An example is that shown in FIG. 9 for maintaining a constant supply voltage for the high-voltage driver 35 that drives the transistors M1A, M1B.

Figure 9:
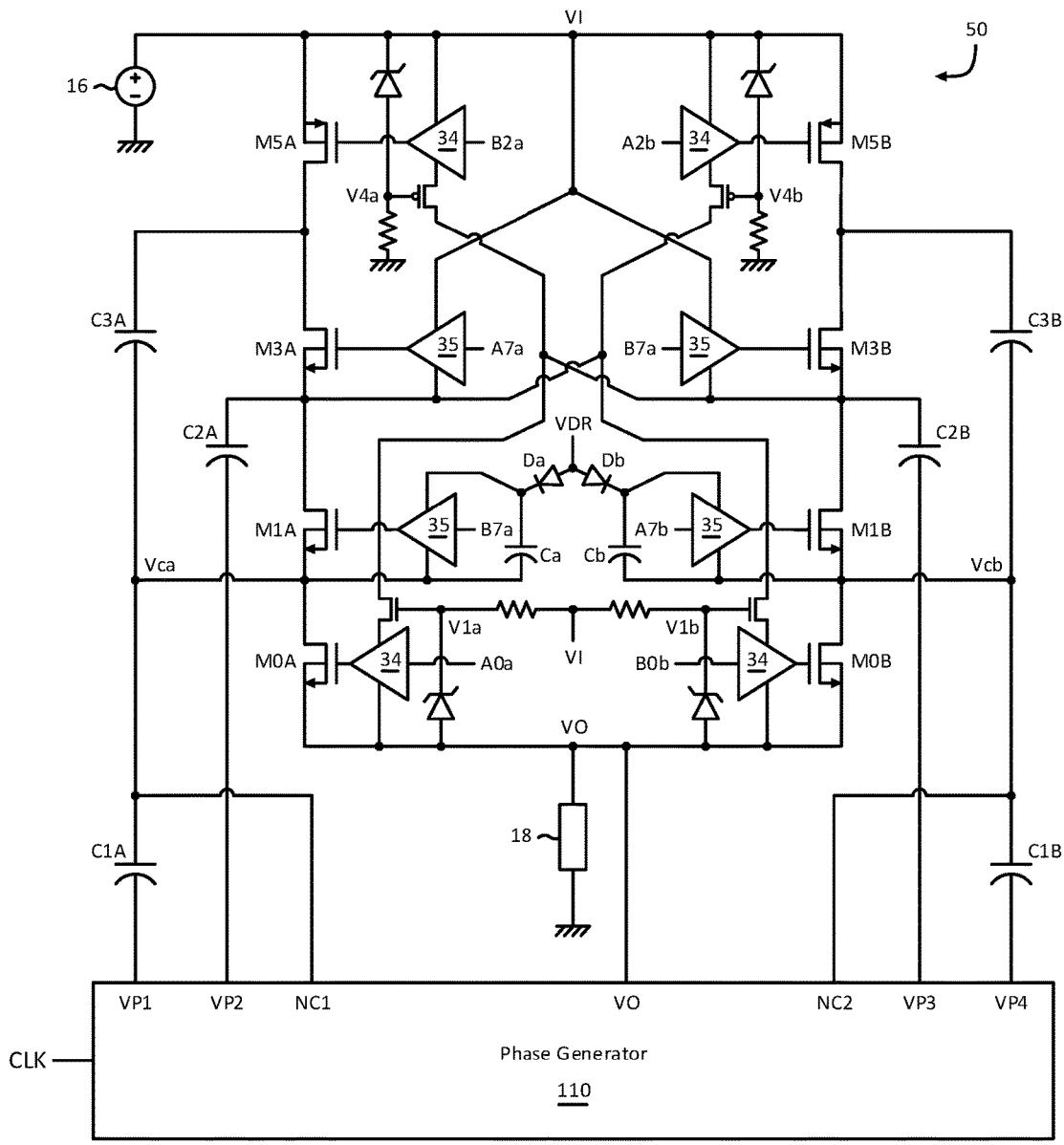

In FIG. 9, there exists a voltage difference between the anode of a pump capacitor C3A and a voltage provided at a voltage-supply terminal VDR. This voltage difference is what ultimately supports the supply voltage that the high-voltage driver 35 uses in order to move charge to the gate of the transistor M1A. However, this voltage difference transitions between first and second anode voltages. For example, the voltage Vca at the anode of the pump capacitor C3A changes by a factor of two during normal operation, between VO and 2VO.

To harness this voltage difference as a supply voltage, the high-voltage driver 35 relies on a voltage-following capacitor Ca and a drive diode Da that connect between the anode of the pump capacitor C3A and the voltage-supply terminal VDR.

The voltage-following capacitor's cathode connects to that of the pump capacitor C3A. It therefore follows this voltage. Meanwhile, the voltage-following capacitor's anode connects to the cathode of the drive diode Da, the anode of which connects to the voltage-supply terminal VDR.

The voltage at the voltage-supply terminal VDR is selected such the drive diode Da transitions between being forward and reversed biased as the cathode voltage Vca transitions between its two values. In addition, the voltage at the at the voltage-supply terminal VDR is selected such that an appropriate gate-drive voltage, for example five volts, is available to the high-voltage driver 35.

At the first cathode voltage, the drive diode Da becomes forward biased. As a result, charge from the voltage-supply terminal VDR charges the voltage-following capacitor Ca. By connecting the high-voltage driver 35 between the anode and cathode of the voltage-following capacitor Ca, it becomes possible to provide a steady supply voltage for the high-voltage driver 35.

The voltage-following capacitor Ca can be provided externally or it can be integrated into a die.

The voltage-supply terminal VDR can be implemented by providing a linear regulator that regulates the voltage present at the high-voltage terminal VO. Alternatively, the voltage-supply terminal VDR can be implemented by providing a connection to internal charge pump node having a suitably high voltage (with an optional linear regulator).

It is apparent from inspection of the circuitry that the voltage-following capacitor Ca acts effectively as a proxy for the pump capacitor C3A but with a voltage difference across it that is more readily controllable to ensure an adequate supply voltage. Such control is achievable by controlling the voltage at the voltage-supply terminal VDR.

An adequate supply voltage is particularly important for avoiding losses in the transistor M1A. This is because even if a supply voltage is high enough to at least cause the transistor to conduct, such a voltage will not result in a high enough electric field to create a broad channel through which current can flow with minimal resistance. This phenomenon is manifested by the inverse relationship between RDSON and gate voltage.

Although the use of circuitry as shown in FIG. 9 provides a way to ensure an adequate supply voltage, it is not without cost. First, there is the need to supply additional capacitors. This consumes die area (or an external ceramic capacitor). Second, the voltage to charge these capacitors comes from regulating a high-voltage source down to a more appropriate voltage, for example, using a linear regulator. This results in loss.

In FIG. 10, the phase generator 110 receives an output voltage from the high-voltage terminal VO and produces first, second, third, and fourth phase voltages VP1-VP4. The first and second phase voltages VP1, VP2 correspond to the first phase of the third cascade-multiplier 50 while the third and fourth phase voltages VP3, VP4 correspond to the second phase of the third cascade-multiplier 50.

The phase generator 110 features four transistor pairs. Each transistor pair generates one of the phase voltages VP1-VP4. A first transistor-pair MH1, ML1 generates the first phase-voltage VP1; a second transistor-pair MH2, ML2 generates the second phase-voltage VP2; a third transistor-pair MH3, ML3 generates the third phase-voltage VP3; and a fourth transistor-pair MH4, ML4 generates the fourth phase-voltage VP4. In each transistor pair, the high-side transistor (e.g. MH1) is a PMOS device while the low-side transistor (e.g. ML1) is an NMOS device.

Separate gate drivers, each of which relies on the voltage at the high-voltage terminal VO to maintain a supply voltage, control each transistor MH1-MH4, ML1-ML4 in the phase generator 110, thereby allowing tri-state operation of each transistor pair. In a first state, a first transistor of the transistor-pair is conducting, and a second transistor of the pair is non-conducting. In a second state, the first transistor of the pair is non-conducting and the second transistor of the pair is conducting. In the third state, which occurs between the first and second states, both the first and second transistors of the pair are non-conducting.

The gate drivers can be implemented using numerous circuit topologies, such as the tapered gate driver illustrated in FIG. 4. Each gate driver receives a driver signal with a label beginning with either an "A" or a "B." A controller 112 generates driver signals AL1, BL1, AL2, BL2 to control low-side transistors ML1, ML2, ML3, ML4 respectively and driver signals BH1, AH1, BH2, AH2 to control high-side transistors MH1, MH2, MH3, MH4 respectively at times dictated by a clock signal provided at a clock input CLK.

In normal operation, the phase generator 110 cycles between a first state and a second state at a specific frequency. The third state occurs between each transition between a first and second state.

Following commencement of the first state, the gate drivers that receive a "B" signal activate their corresponding transistors and the gate drivers that receive an "A" signal de-activate their corresponding transistors. Consequently, the first and third phase voltages VP1, VP3 are equal to the output voltage at the high-voltage terminal VO while the second and fourth phase voltages VP2, VP4 are equal to zero volts.

In contrast, following commencement of the second state, the gate drivers that receive a "B" signal de-activate their corresponding transistors and the gate drivers that receive an "A" signal activate their corresponding transistors. Consequently, the first and third phase voltages VP1, VP3 are equal to zero volts while the second and fourth phase voltages VP2, VP4 are equal to the output voltage at the high-voltage terminal VO.

FIG. 11 illustrates an alternative phase generator 110 that receives an output voltage from the high-voltage terminal VO and produces first, second, third, and fourth phase voltages VP1-VP4. In a dual-phase design, the first and third phase voltages VP1, VP3 are in phase and the second and fourth phase voltages VP2, VP2 are in phase. Consequently, the first and third phase voltages VP1, VP3 are shorted together and the second and fourth phase voltages VP2, VP4 are shorted together. A controller 112 generates driver signals A1, B2 to control low-side transistors ML1, ML2 respectively and driver signals B1, AH to control high-side transistors MH1, MH2 respectively at times dictated by a clock signal provided at a clock input CLK.

Additionally, the phase generator 110 shown in FIG. 11 implements the high-side transistors MH1, MH2 using NMOS transistors instead of using PMOS transistors, as was the case in FIG. 10. The higher mobility of electrons in NMOS transistors allows the high-side transistors MH1, MH2 to be made smaller. This reduces the energy required to activate them. Because NMOS transistors require a gate voltage higher than their source voltage to activate, the high-side transistors MH1, MH2 derive this boost voltage from the pump capacitors within the cascade multiplier that the phase generator 110 is driving. These pump capacitors connect to the power inputs NC1, NC2.

For example, if the phase generator 110 is coupled to the third cascade-multiplier 50, then the gate driver of the high-side transistor MH1 is coupled to the positive terminal of the pump capacitor C1A from phase one. In contrast, the gate driver of the high-side transistor MH2 is coupled to the positive terminal of the pump capacitor C1B from phase two. Therefore, each gate driver and its corresponding high-side transistor is powered by a pump capacitor from a distinct parallel charge-transfer path. These pump capacitors connect to the power inputs NC1, NC2, as shown in FIGS. 8-9.

The phase generator 110 shown in FIG. 11 operates in a manner similar to that described in connection with FIG. 10. The differences mainly arise from the shorted phase voltages and boosted high-side transistors MH1, MH2.

Figure 12:
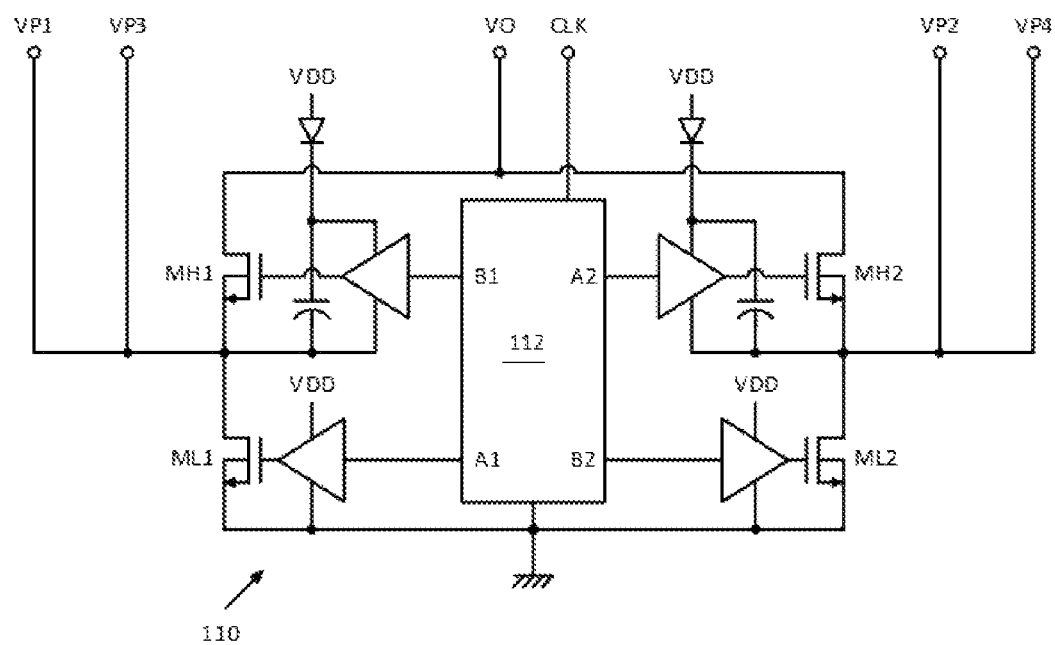

FIG. 12 shows yet another phase generator 110 that is similar to that shown in FIG. 11 but with the voltage relied upon to provide the supply voltage for the high-side transistors MH1, MH2 no longer being supplied from the pump capacitors. Instead, the supply voltage is provided using a voltage-following capacitor and drive diode in a manner similar to that described in connection with FIG. 9.

Figure 13:
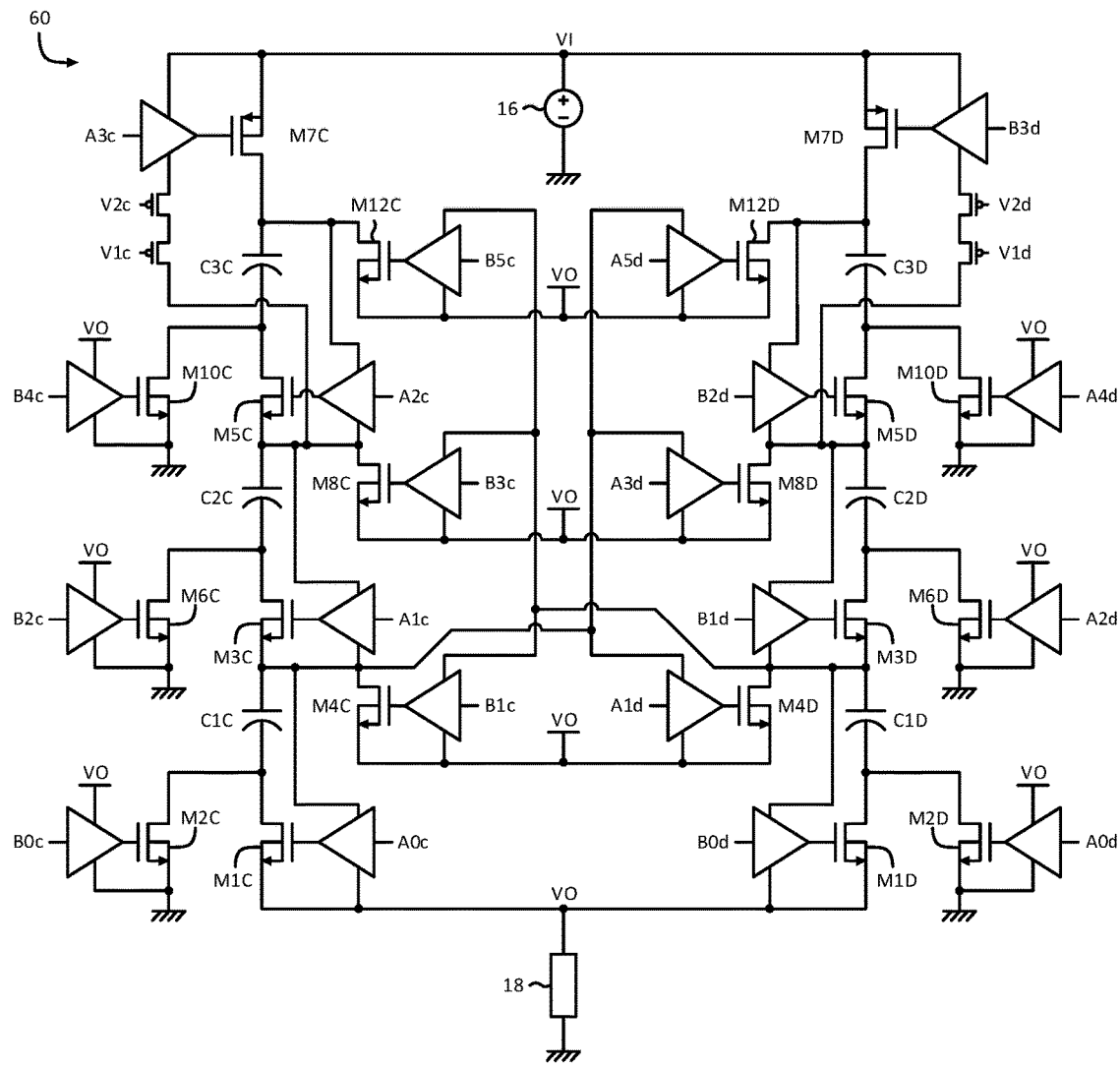
FIG. 13 shows a dual-phase series-parallel switched-capacitor converter and corresponding gate drivers.

A number of alternatives to the switched capacitor power converter designs discussed make use of the approaches embodied in those designs. For example, the converter illustrated in FIG. 13 is a dual-phase series-parallel switched capacitor circuit 60 that includes some gate drivers that are powered by capacitors in either the same charge-transfer path or a parallel charge-transfer path.

The switched capacitor circuit 60 includes a pair of phases. A first phase includes capacitors C1C-C3C, odd transistors M1C-M7C, and even transistors M2C-M12C. Similarly, a second phase includes capacitors C1D-C3D, odd transistors M1D-M7D, and even transistors M2D-M12D. All of the transistors coupled with signals having an "A" prefix through corresponding gate drivers are activated and de-activated at the same time; as is the case for all of the transistors coupled with signals having a "B" prefix through corresponding gate drivers.

The switched capacitor circuit 60 produces an output voltage at its high-voltage terminal VO that is four times lower than an input voltage at the low-voltage terminal VI by cycling between a first state and a second state at a specific frequency. During the first state, the first phase odd transistors M1C-M7C and the second phase even transistors M2D-M12D are activated while the first phase even transistors M2C-M12C and the second phase odd transistors M1D-M7D are de-activated. This switch activation pattern places the second phase capacitors C1D-C3D in parallel with the load 18 and places a series arrangement of the first phase capacitors C1C-C3C in between the source 16 and the load 18.

In contrast, during the second state, the first phase odd transistors M1C-M7C and the second phase even transistors M2D-M12D are de-activated while the first phase even transistors M2C-M12C and the second phase odd transistors M1D-M7D are activated. This switch activation pattern places the first phase capacitors C1C-C3C in parallel with the load 18 and places a series arrangement of the second phase capacitors C1D-C3D in between the source 16 and the load 18.

Unlike either of the dual-phase cascade multipliers 40 or 50, within a single phase of the switched capacitor circuit 60, the gate drivers derive their power from capacitors in both phases. For example, the gate drivers for the corresponding transistors M1C, M3C, M5C are powered from the capacitors C1C, C2C, C3C, respectively while the gate drivers for the corresponding transistors M4C, M8C, M12C are powered from the capacitor C1D.

Furthermore, the voltage stress across the transistors in a series-parallel switched capacitor power converter can be quite high in comparison to cascade multipliers. Assuming twenty-volt input voltage at the low-voltage terminal VI then the maximum voltage across the transistors M12C, M12D is fifteen volts. In this embodiment, the gate-to-source voltage is always five volts and the gate drivers for the top PMOS transistors require two series connected voltage followers that are biased using voltages V1c-V2d.

Although described in the context of single-phase and dual-phase converters, it should be understood that other multi-phase converter configurations can be used. For example, a four-phase cascade multiplier can be constructed by placing two copies of the second cascade-multiplier 40 in parallel and shifting their respective clocks by ninety degrees. Adding an even number of phases is straightforward because every subsequent pair of phases can be run in isolation.

However, if the switched capacitor power converter includes an odd number of phases, it is a little more difficult to power gate drivers from capacitors in different parallel charge-transfer paths. In this case, each gate driver draws power from capacitors in multiple parallel charge-transfer paths, as compared to a single parallel charge-transfer path in the even-numbered phase case.

In general, switched-capacitor power-converters feature a large number of switches and capacitors. By necessity, at least a few of the switches are floating. This means that neither switch terminal is attached to a constant electric potential. A switched-capacitor power-converter that has at least one floating switch can benefit by deriving power from the same charge-transfer path or a parallel charge-transfer path. Examples of such switched-capacitor power-converters include the cascade multiplier, series-parallel, parallel-series, Fibonacci, and voltage-doubler topologies.

The switched-capacitor power-converters and the associated gate drivers illustrated herein can all be integrated on one or more semiconductor substrates.

If all of the transistors are integrated on a single substrate and any of the transistors connect to a floating voltage, then the transistors must be isolated from the substrate. For example, in a CMOS process, NMOS transistors are typically formed in a p-type substrate. These devices can only float if the bulk of the NMOS transistors is isolated from the substrate. If this were not the case, then an alternative possibility would be to use multiple semiconductor substrates.

The capacitors in a switched-capacitor power-converter can either be integrated, discrete, or a combination thereof. The discrete capacitors are typically multi-layer ceramic capacitors while the integrated capacitors are typically planar or trench capacitors. Integrated capacitors can be integrated on the same wafer with their switches, on a wafer separate from their switches, or on a combination thereof. For those cases in which the capacitors and switches are on different wafers, there exit various attachment methods, some of which remove the pin-count limitation of the overall converter.

The ability to re-purpose the pump capacitors is of benefit when the switched-capacitor power-converter uses either integrated capacitors or discrete capacitors.

If discrete capacitors are used, then each capacitor uses at least one pin of an integrated circuit. Having to add extra pins for the gate driver is disadvantageous because, for a given die area, only a limited number of pins is available.

An advantage of integrated capacitors is that they do not require allocation of pins from a limited supply of pins. On the other hand, integrated capacitors consume considerable die area to achieve the necessary levels of capacitance. They are therefore expensive to manufacture.

Typically, a controller produces control signals for activating and de-activating the switches within a switched-capacitor power-converter. For example, in most of the embodiments described above, a controller could have generated the drive signals that are labeled with an "A" or a "B" prefix.

By controlling the "on" and "off" times of the individual switches, a controller can provide many functions. Among these functions are the ability to regulate the output voltage, the ability to shut off the power converter in the event of a fault condition, and the ability to change the gain of the switched capacitor network.

Figure 14:
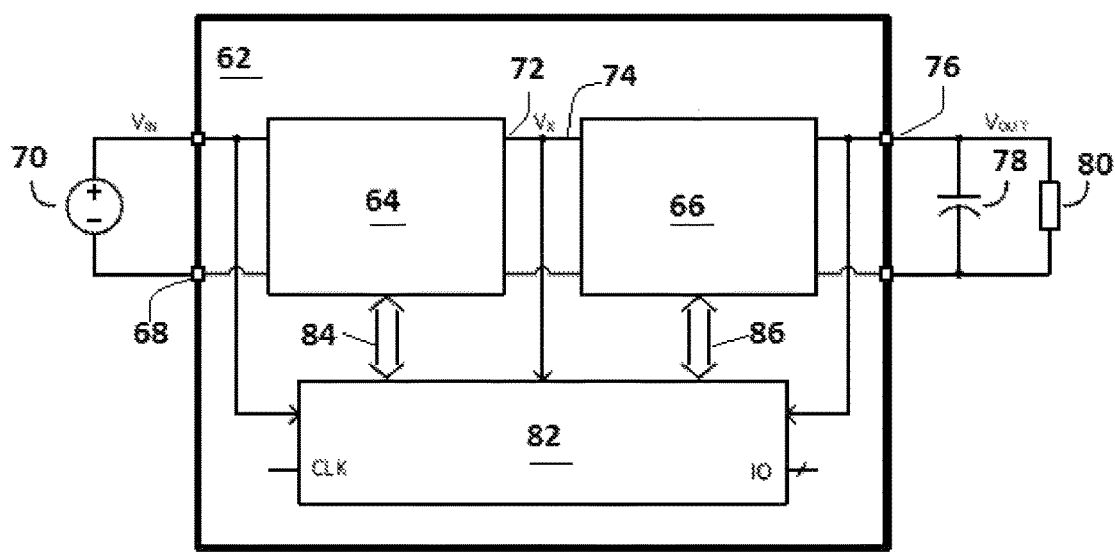
FIG. 14 shows a power converter that includes a cascade multiplier as shown in the preceding figures.

The cascade multipliers 30, 40, 50, 60 described in connection with FIGS. 1-13 find use as a constituent element of a power converter 62 as shown in FIG. 14.

The illustrated power converter 62 features a first element 64 and a second element 66. First terminals 68 of the first element 64 connect to a voltage source 70. Second terminals 72 of the first element 64 connect to first terminals 74 of the second element 66. Second terminals 76 of the second element 66 connect to an output capacitor 78 that is in parallel with a load 80.

A controller 82 provides control signals to the first and second elements 64, 66 and receives feedback signals from the first and second elements 64, 66 through first and second communication links 84, 86. The controller does so in response to a clock signal received through its clock port CLK and to instructions received through its I/O port IO.

In operation, the voltage source 70 presents a first voltage to the first element's first terminals 68. The controller 82 causes the first element 64 to transform this first voltage into an intermediate voltage. The second element 66 receives this intermediate voltage at its first terminals 74 and transforms it into a second voltage that it maintains at its second terminals 76 and makes it available to the output capacitor 78 and the load 80.

In some embodiments, the first element 64 is a regulator and the second element 66 is the switched-capacitor circuit that comprises one of the cascade multipliers 30, 40, 50, 60 described herein. In other embodiments, the first element is the switched-capacitor circuit that comprises one of the cascade multipliers 30, 40, 50, 60 described herein and the second element is regulator.

In some embodiments, the regulator is one that has an inductive element that can be used in connection with controlling charge flow within the capacitors of the switched-capacitor circuit. Examples of regulators that can be used in the power converter 62 include buck converters, boost converters, and buck/boost converters.

Power converters of the type shown in FIG. 14 are described in detail in U.S. Pat. Nos. 8,860,396, 8,743,553, 8,723,491, 8,503,203, 8,693,224, 8,724,353, 8,619,445, 9,203,299, 9,742,266, 9,041,459, Publication No. 2017/0085172, U.S. Pat. No. 9,887,622, 9,882,471, PCT Publication No. WO2017161368, PCT Publication No. WO2017/091696, PCT Publication No. WO2017/143044, PCT Publication No. WO2017/160821, PCT Publication No. WO2017/156532, PCT Publication No. WO2017/196826, and U.S. Publication No. 2017/0244318, the contents of which are all incorporated herein by reference.

Generally speaking, a non-abstract computer accessible storage medium may include any non-transitory storage media accessible by a computer during use to provide instructions and/or data to the computer. For example, a computer accessible storage medium may include storage media such as magnetic or optical disks and semiconductor memories. Such a non-abstract computer accessible storage medium can be used to store information representative of the power converter or components thereof for use, hereafter referred to as the "system," in a manufacturing process.

Generally, a non-abstract database representative of the system may be a database or other data structure that can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Various features, aspects, and embodiments of switched-capacitor power-converters have been described herein. The features, aspects, and numerous embodiments described are susceptible to combination with one another as well as to variation and modification, as will be understood by those having ordinary skill in the art. The present disclosure should therefore be considered to encompass such combinations, variations, and modifications. Additionally, the terms and expressions that have been employed herein are used as terms of description and not of limitation. There is no intention, in the use of such terms and expressions, of excluding any equivalents of the features shown and described, or portions thereof. It is recognized that various modifications are possible within the scope of the claims. Other modifications, variations, and alternatives are also possible. Accordingly, the claims are intended to cover all such equivalents.

It is to be understood that the foregoing description is intended to illustrate and not to limit the scope of the invention, which is defined by the scope of the appended claims. Other embodiments are within the scope of the following claims.

The invention claimed is:

1. An apparatus comprising a switched-capacitor power-converter, wherein said switched-capacitor power-converter comprises an input, an output, a first plurality of switches, a second plurality of switches, and gate-driving circuits, each of which corresponds to a switch from said first plurality of switches, wherein each gate-driving circuit uses charge from a selected pump capacitor from a plurality of pump capacitors to operate a corresponding one of said switches from said first plurality of switches, wherein said first plurality of switches comprises a first switch, wherein said second plurality of switches comprises a second switch, wherein, during clocked operation of said switched-capacitor power-converter, said first plurality of switches transitions between different states, each of which corresponds to a particular interconnection of said pump capacitors, said pump capacitors including a first pump capacitor, wherein, during clocked operations, said first switch closes, thereby establishing a connection with said first pump capacitor, wherein, prior to said first switch closing, said second switch closes, wherein as a result of closure of said second switch, said first pump capacitor is pre-charged by the time said first switch closes.

2. The apparatus of claim 1, wherein said second switch is connected such that, when said second switch closes, a voltage arises across said first pump capacitor.

3. The apparatus of claim 1, wherein said second switch connects to an anode of said first pump capacitor.

4. The apparatus of claim 1, wherein closing said second switch connects said first pump capacitor to a phase voltage.

5. The apparatus of claim 4, wherein said second switch and said first switch are synchronized in operation.

6. The apparatus of claim 5, wherein said first switch and said second switch close concurrently.

7. The apparatus of claim 5, wherein said second switch closes before said first switch closes.

8. The apparatus of claim 7, wherein there exists a fixed time interval between closing said second switch and closing said first switch.

9. The apparatus of claim 1, further comprising a pre-charging circuit configured to limit voltage across said switches from said first plurality of switches during power-up of said switched-capacitor power-converter.

10. The apparatus of claim 1, further comprising a phase generator comprising phase switches, wherein said second switch is one of said phase switches.

11. The apparatus of claim 10, wherein said phase generator is configured to provide first and second phase voltages, wherein said second switch provides said first phase voltage upon closure thereof, and wherein said phase generator further comprises a third switch that, when closed provides said second phase voltage, wherein said first plurality of switches comprises a first subset of switches and a second subset of switches, wherein switches in said first subset open and close together, wherein switches in said second subset open and close together at times that differ from times at which said switches in said first subset open and close together, wherein, said first switch is in said first subset, wherein said second switch is synchronized with switches in said first subset, and wherein said third switch is synchronized with switches in said third subset.

12. The apparatus of claim 11, wherein, as a result of being synchronized with switches in said first subset, said second switch closes prior to closure of all switches in said first subset, and wherein, as a result of being synchronized with switches in said second subset, said third switch closes prior to closure of all switches ins said first subset.

13. The apparatus of claim 1, further comprising a control block that comprises circuitry that is configured to provide a first plurality of drive signals and to provide a second plurality of drive signals, wherein each drive signal from said first plurality of drive signals is connected to a gate-driving circuit that drives a gate of a transistor from a first plurality of transistors, wherein each drive signal from said second plurality of drive signals is connected to a gate-driving circuit that drives a gate of a transistor from a second plurality of transistors, wherein said drive signals from said first plurality of drive signals cooperate to cause all transistors that are in said first plurality of transistors to close together following closure of said second switch, and wherein said drive signals from said second plurality of drive signals is configured to cause all transistors in said second plurality of transistors to close together following closure of a third switch from said second plurality of switches.

14. The apparatus of claim 13, wherein said circuitry comprises a level shifter that is configured to receive first and second voltages and to transform said first and second voltages into third and fourth voltages, wherein said level shifter is configured to present a voltage difference that is equal to a difference between said third and fourth voltage to a gate terminal of a transistor that is from said first plurality of transistors.

15. The apparatus of claim 1, further comprising a phase generator comprising said second plurality of switches, said phase generator being configured to provide a time varying voltage level to one terminal of each of said pump capacitors, wherein said phase generator is configured to generate a voltage level for at least one pump capacitor in a first charge-transfer path using a voltage from a pump capacitor in a second charge-transfer path.

16. An apparatus comprising a switched-capacitor power-converter that comprises first and second pluralities of switches and gate-driving circuits corresponding to said switches in said first plurality of switches, said gate-driving circuits being configured to rely on charge on pump capacitors to cause said switches from said first plurality of switches to transition between states, wherein, said switched-capacitor power-converter undergoes clocked operation that consists of consecutive clock cycles during each of which a switch from said second plurality of switches connects to a first pump capacitor and then a first switch from said first plurality of switches connects to said first pump capacitor.

17. The apparatus of claim 16, wherein, when said switch from said second plurality of switches connects to said first pump capacitor, said first pump capacitor begins to charge.

18. The apparatus of claim 16, wherein said switch from said second plurality of switches connects to both said first pump capacitor and a second pump capacitor, and wherein, after said switch from said second plurality of switches has closed, a second switch from said first plurality of switches connects to a second pump capacitor.

19. The apparatus of claim 16, wherein while said switch from said second plurality of switches is connected to said first pump capacitor, a second pump capacitor is being discharged.

20. An apparatus comprising a switched-capacitor power-converter that comprises first and second pluralities of switches and gate-driving circuits corresponding to said switches in said first plurality of switches, said gate-driving circuits being configured to rely on charge stored on pump capacitors to cause said switches from said first plurality of switches to transition between states, wherein, said switched-capacitor power-converter undergoes clocked operation that consists of consecutive clock cycles, each of which includes a portion during which at most a second switch from said second plurality of switches is connected to said pump capacitors.

* * * * *